March 7, 1961 A. W. BARRY ET AL 2,974,279
VOLTAGE COMPENSATED RESISTANCE BRIDGE
Filed Nov. 18, 1957
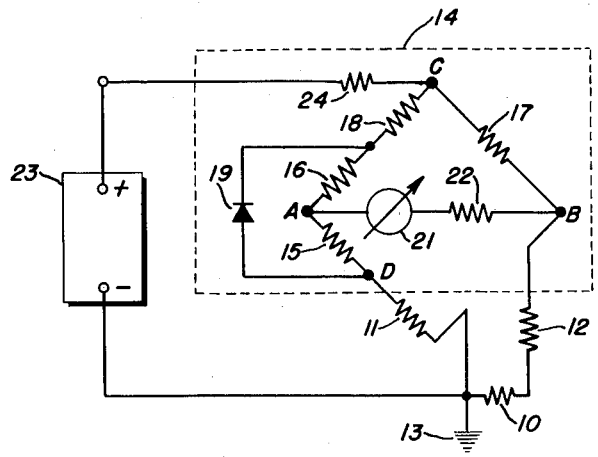
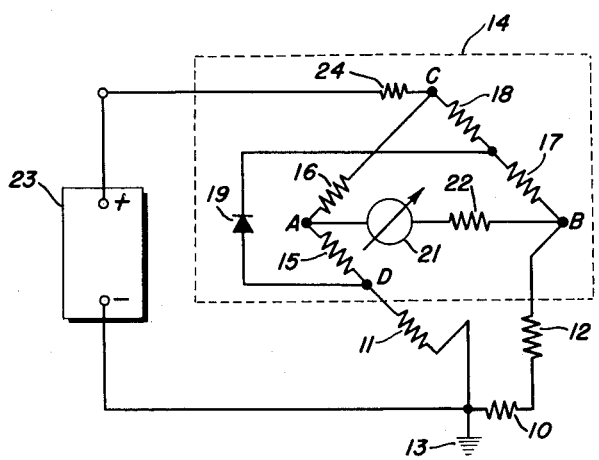
AUSTIN W. BARRY
and RICHARD P. SCHAKE
INVENTORS United States Patent Office 2,974,279
Patented Mar. 7, 1961

2,974,279

VOLTAGE COMPENSATED RESISTANCE BRIDGE

Austin W. Barry, Linden, and Richard P. Schake, East Orange, N.J., assignors, by mesne assignments, to Daystrom, Incorporated, Murray Hill, N.J., a corporation of New Jersey Filed Nov. 18, 1957, Ser. No. 697,008

12 Claims. (Cl. 324—62)

This invention relates to an electrical bridge arrangement and more particularly to a voltage compensated resistance bridge.

The voltage compensated resistance bridge arrangement of our invention is of particular value for use with resistance type transducers wherein the resistance of the transducer varies with changes in the value of a condition under measurement. In such applications, the source of potential which supplies the resistance bridge may vary over a relatively wide range. If the transducer forms one arm of an ordinary Wheatstone bridge having a D.-C. instrument connected across one pair of opposed bridge diagonals, and an unregulated power supply connected across the other diagonals, it will be apparent that the instrument deflection will change with supply voltage, so long as the bridge remains unbalanced. For accurate indications with such an arrangement, a closely regulated power supply is necessary.

Since regulated power supplies are not always available at the installation, a resistance type transducer and bridge arrangement is desired which provides accurate indications in the face of power source voltage variations. Currently, ratiometer type indicators are used in such applications. With the ratiometer, the restoring torque on the instrument is made a function of the supply voltage whereby the instrument indication is independent of supply voltage.

Ratiometers are, however, both complex in mechanical construction and, consequently, costly of manufacture. The voltage compensated resistance bridge of our invention eliminates the need for either a closely regulated power supply or a ratiometer type indicator. With our novel resistance bridge, a simple D.-C. instrument of the permanent magnet, movable coil type may be used. The cost and complexity of such an arrangement is greatly reduced over that utilizing the ratiometer type indicator.

An object of this invention is the provision of a Wheatstone type bridge arrangement which functions substantially independently of variations in supply voltage thereto under both bridge balanced and unbalanced conditions.

An object of this invention is the provision of a Wheatstone type bridge arrangement which includes a Zener diode, the said arrangement providing accurate output indications regardless of supply voltage variations.

An object of this invention is the provision of a voltage compensated resistance bridge which is particularly adapted for use with resistance-type transducers which are, in turn, responsive to conditions under measurement, the output from the said bridge being substantially independent of variations in the supply voltage thereto.

An object of this invention is the provision of a circuit arrangement comprising a Wheatstone bridge, a source of D.-C. potential connected across one diagonal of the bridge; a compensating resistor in one arm of the bridge, a semi-conductor Zener diode connected across the source of D.-C. potential through the said compensating resistor, the said semi-conductor being arranged in reverse-polarity sense relative to the source of D.-C. potential.

These and other objects and advantages will become apparent from the following description when taken with the accompanying drawings. It will be understood that the drawings are for purposes of illustration and are not to be construed as defining the scope or limits of the invention, reference being had for the latter purposes to the appended claims.

In the drawings wherein like reference characters denote like parts in the several views:

Figure 1 is a schematic circuit diagram of our novel voltage compensated resistance bridge; and Figure 2 is a schematic circuit diagram of our bridge showing an alternative connection for the voltage compensation arrangement therein.

Reference is first made to Figure 1 of the drawings wherein there is shown a resistance type transducer 10, the resistance of which varies with the magnitude of the condition under measurement. If temperature is to be measured, for example, the transducer 10 may comprise a length of nickel or copper, or other material having similar characteristics and placed in heat exchange relation with the substance or article of which the temperature is to be measured. In many applications, the transducer is spaced a relatively great distance from the indicating instrument. For this reason, we show resistors 11 and 12 in the leads from the transducer; the said resistors representing the resistance of the lead wires. One end of the resistance type transducer 10 is connected directly to a common ground connection 13. In a typical aircraft installation, for example, the transducer 10 is connected directly to the aircraft engine in heat exchange relation therewith for measurement of engine temperature. The remainder of the bridge components are generally packaged within a housing located in the aircraft cockpit, the said components being shown within the broken line area designated 14. Thus, the value of the lead resistances 11 and 12 may be substantial and significant, since the engine may be located a distance from the cockpit.

From the drawings, it will be apparent that the resistor 10, together with the lead resistances 11 and 12, form a portion of a Wheatstone bridge which comprises, also, bridge resistors 15, 16 and 17. In addition, our novel voltage compensated bridge arrangement includes a voltage compensating resistor 18 and a diode 19. The diode 19 is of the type which exhibits a Zener voltage when subjected to a reverse-potential. The diode has a high inverse resistance up to the Zener voltage, but above the Zener voltage the resistance decreases. Such diodes are commonly made of silicon.

It will be understood that diodes of the Zener type are commonly utilized in circuitry wherein a constant reference voltage is desired. By drawing little or no power from the diode circuit, a relatively constant reference voltage may be maintained. If, however, the current drawn from the diode circuit varies substantially, the resultant voltage drop across the diode is also substantial. Heretofore, if the current drawn from the diode varied, for example, from nearly zero current to a point corresponding to the maximum voltage capacity thereof, the diode could not be used to function as a potential regulator since the voltage drop thereacross also changed. In the novel voltage compensated bridge arrangement of our invention, the above imperfection of the diode as a voltage regulator is overcome by incorporating the diode in the resistance bridge in such a manner that the varying current therethrough also flows through portions of the bridge. This results in a change in the balance point of the bridge and, by proper location and adjustments of the bridge components, the change in the balance point is made to compensate for the change in the diode potential.

As seen in Figure 1, the compensating resistor 18 is connected in series circuit with the bridge resistor 16, while the Zener diode 19 is connected across the bridge resistors 15 and 16. An output circuit, comprising a D.-C. instrument 21 and series circuit range and temperature compensation resistor 22, is connected across the output diagonals of the bridge, designated by the points A and B. The instrument 21 may be calibrated in terms of the temperature under measurement, or any other suitable terms. A D.-C. source of potential 23 is connected between the common ground connection 13 and the bridge through a series voltage dropping resistor 24, thereby providing a supply potential across the other bridge diagonals designated by the reference characters C and D. The D.-C. voltage source has been shown in block form in the drawing and it will be understood that a D.-C. generator or battery, or any other suitable source may be used. With the bridge of our invention, the source voltage does not have to be closely regulated, since the bridge output is not sensitive to variations in the supply potential.

The polarity of the D.-C. source 23 is such that the diode is connected in a reverse-potential manner in the circuit. The supply voltage is of sufficient magnitude that the diode normally breaks down and conducts in the reverse direction. Thus, in our bridge arrangement, the diode normally operates within the Zener region of conduction, above the break down voltage.

As mentioned above, Zener diodes are commonly utilized in potential regulation circuits. They ordinarily function to provide a constant voltage, however, only when little or no power is drawn from the diode since the diode voltage does vary with changes in supply voltage thereto. In our novel bridge circuit, this imperfection of the diode as a voltage regulator is overcome by incorporating the diode in the bridge arrangement in such a manner that the varying current through the diode passes through portions of the bridge. With a proper selection of bridge components, the varying current through a portion of the bridge causes a change in the balance point in the bridge which compensates for the change in diode voltage. In this manner, the bridge functions to provide accurate instrument indications of resistance changes of the transducer in the face of variations in the supply potential 23.

The selection of the proper value for the compensating resistor 18 depends upon the value of most of the other bridge components including also the value of the lead resistances 11 and 12 from the transducer 10. Rather complex bridge equations may be developed from which the proper value of the bridge components may be determined. Without developing such equations, it will be apparent that any current flow through the Zener diode 19 also flows through the lead resistance 11 and compensating resistor 18. A value of compensating resistor 18 is chosen such that variations on the supply potential 23 do not affect the meter indication. Thus, a simple bridge circuit, which uses a conventional D.-C. instrument 21, may be made to accurately measure the resistance value of the transducer 10 in any suitable terms in the face of supply voltage variations. The value of the resistor 22 is selected to properly adjust for the range of the transducer 10.

An alternative connection for the diode 19 and compensating resistor 18 is shown in Figure 2 of the drawings. Referring, then, to Figure 2, it will be noted that the compensating resistor 18 may be placed in series with the bridge arm 17 instead of resistor 16. The one end of the diode 19 is then connected between the resistors 17 and 18 instead of resistors 16 and 18, as in Figure 1.

The arrangement functions in a manner similar to that of Figure 1 whereby variations in supply voltage do not affect the accuracy of indication of the instrument 21.

It will be apparent that in an application in which no lead resistance is present in the leads of the transducer 10 (or the resistance is negligible) the value of the resistors represented by the reference characters 11 and 12 reduces to zero. A correct value of compensating resistor 18 may still be selected to provide a voltage compensated resistance bridge.

Having now described our invention in detail, in accordance with the patent statutes, various other changes and modifications will suggest themselves to those skilled in this art. It is intended that such changes and modifications shall fall within the spirit and scope of the invention as recited in the following claims.

We claim:

1. A circuit arrangement comprising a Wheatstone bridge, a source of D.-C. potential connected across one diagonal of the bridge, a compensating resistor in series circuit with one arm of the bridge, a semi-conductor Zener diode in addition to the bridge arms connected across the source of D.-C. potential through the said compensating resistor, the said semi-conductor being arranged in reverse-polarity sense relative to the source of D.-C. potential, the said compensating resistor compensating for changes in the voltage drop across the said Zener diode with changes in current through the said Zener diode which changes result from variations in the potential of the said source of D.-C. potential.

2. The invention as recited in claim 1 wherein the said diode normally operates within the Zener region.

3. An arrangement responsive to the resistance of a variable resistor, the said arrangement comprising a Wheatstone bridge, the said variable resistor comprising one arm of the said bridge, a source of D.-C. potential connected across one pair of opposed bridge junctions, a compensating resistor in series circuit connection in a second arm of the bridge, and a semi-conductor diode in addition to the bridge arms connected across the said source of D.-C. potential through the said compensating resistor, the said semi-conductor diode being arranged in reverse-polarity sense with the source of D.-C. potential, the said compensating resistor compensating for changes in the voltage drop across the said Zener diode with changes in current through the said Zener diode which changes result from variations in the potential of the said source of D.-C. potential.

4. The invention as recited in claim 3 wherein the said diode normally operates within the Zener region.

5. The invention as recited in claim 3 including a D.-C. instrument, and means connecting the said D.-C. instrument across the other pair of opposed bridge junctions.

6. An arrangement responsive to the resistance of a variable resistor having a pair of leads having resistance, the said arrangement comprising a Wheatstone bridge, the said variable resistor comprising a first arm of the said bridge, a source of D.-C. potential connected across one diagonal of the bridge, a compensating resistor in series circuit connection in a second arm of the bridge, the resistance of the pair of leads of the variable resistor being in the said first and a third arm of the bridge, respectively, and a semi-conductor diode connected across the source of D.-C. potential through the said compensating resistor, the said diode being arranged in reverse-polarity sense to the source of D.-C. potential, the said compensating resistor compensating both for the resistance of the lead in the said third arm of the bridge and also for changes in the voltage drop across the said Zener diode with changes in current through the said Zener diode which changes result from variations in the potential of the said source of D.-C. potential.

7. The invention as recited in claim 6 wherein the said semi-conductor diode normally operates within the reverse polarity break-down region.

8. The invention as recited in claim 6 including a D.-C. instrument connected across the other pair of opposed bridge junctions.

9. The invention as recited in claim 8 wherein the said variable resistor comprises a resistor-type transducer, the resistance of which varies with the value of a condition under measurement, the said D.-C. instrument being calibrated in terms of the condition under measurement.

10. A circuit arrangement having an output which is responsive to the resistance of a variable resistor and which is substantially independent of changes in potential of a D.-C. source of supply potential energizing the circuit arrangement, the said arrangement comprising a Wheatstone bridge in which the said variable resistor comprises a first bridge arm, a series voltage dropping resistor, means connecting the D.-C. source of supply potential across one diagonal of the bridge through the said series dropping resistor, an output circuit connected across the other diagonal of the bridge, a compensating resistor in series circuit connection in a second arm of the bridge, and a semi-conductor Zener diode connected across the said one bridge diagonal through the said compensating resistor, the said Zener diode being arranged in reverse-polarity sense to the said D.-C. source of supply potential and normally operating within the reverse polarity breakdown region, the said compensating resistor compensating for changes in the voltage drop across the said Zener diode with changes in current through the said Zener diode which changes result from variations in the potential of the said D.-C. source of supply.

11. The invention as recited in claim 10 wherein the said variable resistor has a pair of leads having resistance, the resistance of the pair of leads of the variable resistor being in the said first and a third arm of the bridge, respectively, with the said lead in the third bridge arm in series circuit connection with the series connected Zener diode and compensating resistor, the said compensating resistor compensating also for the resistance of the lead in the said third arm of the bridge.

12. The invention as recited in claim 11 including a conductive connection between one side of the D.-C. source of supply potential and the junction between the variable resistor and the resistor lead in the third arm of the bridge.

References Cited in the file of this patent
UNITED STATES PATENTS

| | | |
|---|---|---|
| 2,571,605 | Peters | Oct. 16, 1951 |
| 2,711,650 | Weisheit | June 28, 1955 |
| 2,714,702 | Shockley | Aug. 2, 1955 |
| 2,864,053 | Woodworth | Dec. 9, 1958 |